June 19, 1928. Re. 17,000

E. F. McHUGH

VENTILATING SASH

Original Filed Feb. 25, 1925

INVENTOR.
Edward F. McHugh,
BY
Geo. P. Kimmel
ATTORNEY.

Reissued June 19, 1928. Re. 17,000

UNITED STATES PATENT OFFICE.

EDWARD FRANCIS McHUGH, OF KINGSTON, PENNSYLVANIA.

VENTILATING SASH.

Original No. 1,626,547, dated April 26, 1927, Serial No. 11,569, filed February 25, 1925. Application for reissue filed April 26, 1928. Serial No. 273,118.

This invention relates to improvements in ventilating sashes for use upon store fronts in supporting plate glass windows and contemplates the provision of a novel form of supporting means which will resiliently support the lower edge or edges of the plate glass in order to take up vibrations, knocks, and jars and the like in order to prevent cracking of the glass.

Another object of the invention is to provide draining means upon the inner side thereof whereby upon the washing of the inside of the plate glass the water will run down the glass and through the openings and thence outwardly and over the sill covering so that the floor will not be subjected to standing water.

A further object of the invention is the provision of a novel form of back member which secured to a backing stop forming the front edge of the floor display window and which includes an upwardly crimped portion upon the lower side thereof which will provide a seat for a supporting member thereon and which has spaced from the upper edge thereof the lower edge of a plate glass window through the instrumentality of a resilient packing or the like whereby a triple resiliency is provided beneath the lower edge of the plate glass window in order that all shocks, jars and the like will be prevented so that the glass will not be broken when subjected to such treatment.

With the above and other objects in view, the invention further includes the following novel features and details of construction, to be hereinafter more fully described, illustrated in the acompanying drawing and pointed out in the appended claims.

In the drawing:—

Figure 1:
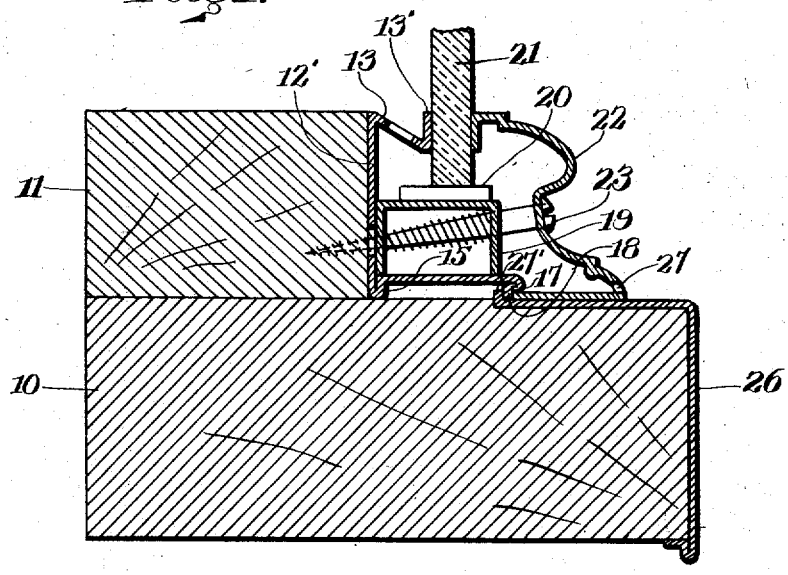
Figure 1 is a fragmentary view in vertical section of a window showing the present invention applied thereto and supporting a plate glass thereon.
Figure 2:
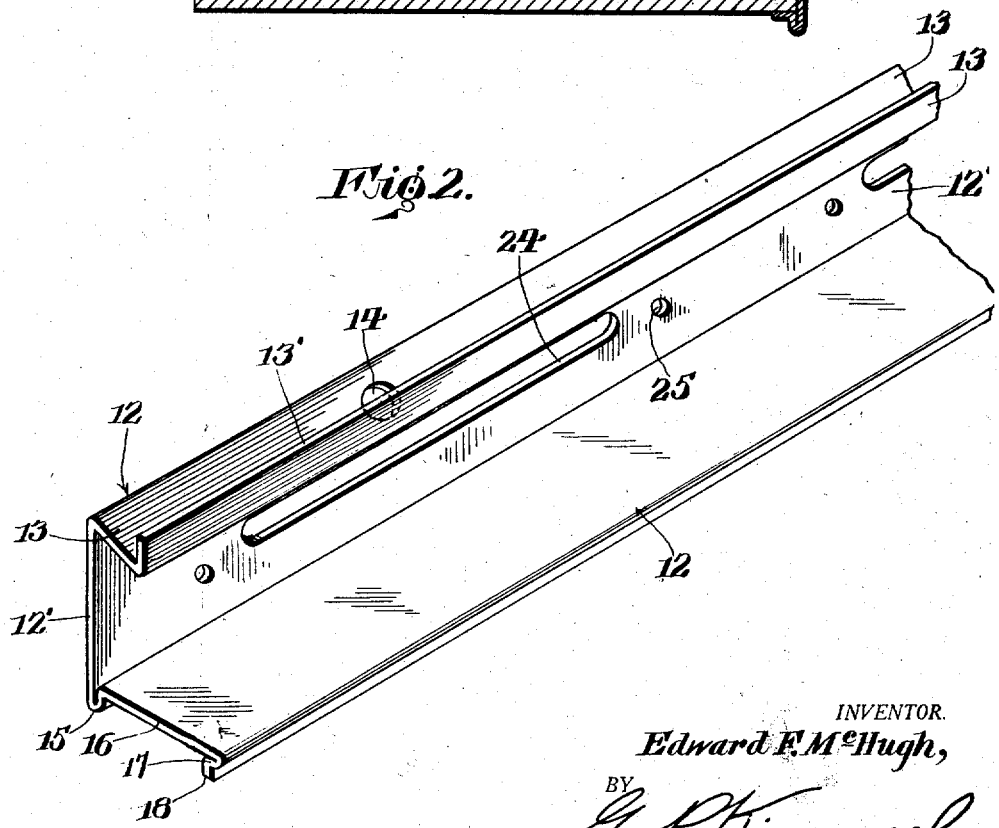
Figure 2 is a detail perspective of the back member per se.

Referring to the drawing in detail, wherein like characters of reference denote corresponding parts, the reference character 10 indicates the sill and 11 the backing stop of the store window and to which the present invention is applied.

The present invention embodies a back member 12 formed from a single length of sheet metal of the desired width and gauge and shaped to provide a vertical part 12′ of appropriate width standing on its lower longitudinal edge. The part 12′ corresponds in width to the thickness of back stop 11 so that the upper edge of part 12′ will be flush with the upper face of stop 11. The part 12′ is termed the body portion of member 12. The part 12′ at its top merges into a forwardly directed downwardly inclined part 13 which terminates in a vertically disposed flange 13′ to provide in connection with part 13 a combined clamping member and gutter. The part 13 is coextensive with and of materially less width than part 12′. The flange 13′ is coextensive with part 13 and has its top edge arranged in alinement with the top edge of part 12′. The part 13 is formed with a plurality of ventilating or drain openings 14.

Extending forwardly with respect to the lower portion of part 12′ and at right angles thereto is a horizontally disposed part 16 which constitutes a cushion. Depending from the rear edge of the part 16 is a vertically disposed leg 15 which merges into the bottom edge of part 12′ and not only provides for supporting part 16, but further provides for spacing the rear edge of part 16 from the forward face of part 12′. The part 16 is of greater width than part 13 and of less width than part 12′.

The forward edge of part 16 merges into a rearwardly directed angle shaped flange which is disposed below part 16. The flange includes a horizontal portion 17 and a vertical portion 18. The portion 18 abuts the lower face of part 16, is integral with and extends inwardly from the forward edge of part 16. The rear of portion 17 terminates in the top of portion 18 and the latter provides a vertically disposed supporting leg for and which is inset with respect to the forward edge of the part 16. The legs 15 and 18 support the cushion formed by the part 16 in spaced relation with respect to the sill 10. See Figure 1. Positioned upon the upper face of the cushion 16, is a substantially inverted U-shaped supporting member or setting block 19 which includes upon the upper edge thereof a cushioning layer which may be formed of fabric or leather, and which is indicated as at 20, and which is adapted to receive thereon the lower edge of a plate glass or the like 21. These supporting members 19 are arranged in spaced relation upon the cushion portion 16 and vary in number, according to the size and weight of the glass.

In order to provide means upon the outer side of the plate glass 21 for holding the same upon the cushioning member 19 and leather support 20, I provide the usual and ordinary type of outer moulding 22 and which has extending at an inclination therefrom suitable fastening elements in the form of screws 23 which in turn extend between the supporting member 19 and through slots 24 provided upon the vertical portion of the back member 12 whereby the inner end portion of the screw member 23 may be embedded in the backing stop. The back member 12 further includes openings 25 which may receive nails, screws and the like therethrough for holding the same rigidly and vertically upon the backing stop.

In this invention, I also employ a sill covering 26 which extends along an appreciable distance upon the upper side of the sill 10 and terminates in an upturned flange 27′ arranged in the rear of and in contacting engagement with the downwardly extending leg formed by the vertical portion 18 of the rearwardly directed angle shaped flange in order to provide a rigid support for this leg and in order to prevent the same from becoming embedded within the upper side of the sill 10 when subjected to the weight of the plate glass 21. The outer moulding has its inner lower edge arranged in contacting engagement with the vertical portion 18 and below the horizontal portion 17 of the rearwardly directed, angle shaped flange, and as shown in Figure 1, the flange 27′, the vertical portion 18 and the inner lower edge of the outer moulding interlock to provide a water proof joint and prevent movement of the parts.

It will thus be noted from the foregoing description and accompanying drawing that a person within the store window when washing the plate glass 21 will cause water to drain downwardly upon the inner side of the glass 21 and into the gutter formed upon the upper edge of the back member 12 as indicated at 13 and flow or drain through the ventilating or drain holes, or openings 14 provided therein and will thence find its way between the backing member 12 and the outer moulding 22 through the opening 27 provided adjacent the lower edge thereof whereby the water or moisture will be drained outwardly and upon the sill covering 26 in order that no moisture will be allowed to stay between the back member 12 and outer moulding 22 which would deteriorate or destroy the ventilating sash.

It is also to be noted that this invention provides an exceedingly useful as well as advantageous support for plate glass inasmuch as the cushioning portion 16 provided by the crimpings on the back member 12, supports the supporting member 19 thereon which in turn carries a fabric or leather strip 20 upon the upper side thereof which supports or engages the lower edge of a plate glass window 21 and the like in order to prevent cracking of the glass when the same is subjected to vibrations, shocks, jars and the like.

The invention is susceptible of various changes in its form, proportions, and minor details of construction, and the right is herein reserved to make such changes as properly fall within the scope of the appended claims.

Having thus described my invention what is claimed is:

1. A ventilating window sash, a back member secured to the window backing stop, a raised cushion portion horizontally disposed and formed with the lower edge of the back member, said cushion portion terminating at its forward edge in a crimped downwardly extending supporting leg and also with a supporting leg at its juncture with the back member, a sill covering for the sash and receiving the forward supporting leg of the cushion portion, a substantially inverted U-shaped setting block mounted upon the cushion portion, resilient means carried by said block and adapted for receiving the lower edge of a plate glass, and an outer moulding secured to the backing stop and mounted upon the sill covering in a manner whereby the upper portion of said moulding engages the glass, and its lower portion disposed relatively with the crimped downwardly extending supporting leg to prevent upward and rear movement of the lower portion.

2. In a ventilating window sash, the combination with a sill and a backing stop, a back member secured to the sill, a cushion portion formed on the back member, supporting legs for spacing the cushion portion from the sill and one of said supporting legs being bent inwardly and thence downwardly upon itself, a covering for the sill and terminating at its inner end in an upturned flange arranged to the rear of and in contacting engagement with the downturned portion of the last mentioned supporting leg, and an outer moulding cooperating with the back member and having its lower edge arranged in contacting engagement with the downturned portion and below the inwardly extending portion of said supporting leg.

3. A back member for use in ventilating sashes for store fronts comprising a unitary element formed of a vertically disposed body portion, a cushioning portion extending forwardly from and positioned above the bottom of said body portion, means between the rear of said cushioning portion and the bottom of the body portion and means depending from the forward part of the cushioning portion for respectively supporting the latter at its rear and front and for maintaining it in spaced relation with respect to a sill.

4. A back member for use in ventilating sashes for store fronts comprising a unitary element formed of a vertically disposed body portion, a cushioning portion extending forwardly from and positioned above the bottom of said body portion, means between the rear of said cushioning portion and the bottom of the body portion and means depending from the forward part of the cushioning portion for respectively supporting the latter at its rear and front and for maintaining it in spaced relation with respect to a sill, the means depending from the forward part of said cushioning portion being inset with respect to the front edge thereof.

5. A back member for use in ventilating sashes for store fronts comprising a unitary element formed of a vertically disposed body portion, a cushioning portion extending forwardly from and positioned above the bottom of said body portion, means between the rear of said cushioning portion and the bottom of the body portion and means depending from the forward part of the cushioning portion for respectively supporting the latter at its rear and front and for maintaining it in spaced relation with respect to a sill, the means depending from the forward part of said cushioning portion being spaced rearwardly from the forward edge thereof.

6. A back member for use in ventilating sashes for store fronts comprising a unitary element formed of a vertically disposed body portion, a cushioning portion extending forwardly from and positioned above the bottom of said body portion, supporting means for and depending from the rear of the cushioning portion and terminating in the bottom of said body portion, and a rearwardly directed angle shaped flange integral with the forward edge of the cushioning portion and including at its rear a vertical part opposing said means and providing a support for the front of the cushioning portion.

7. A back member for use in ventilating sashes for store fronts comprising a unitary element formed of a vertically disposed body portion, a cushioning portion extending forwardly from and positioned above the bottom of said body portion, means between the rear of said cushioning portion and the bottom of the body portion and means depending from the forward part of the cushioning portion for respectively supporting the latter at its rear and front and for maintaining it in spaced relation with respect to a sill, and a combined clamping member and gutter projecting forwardly at a downward inclination from the upper end of said body portion and provided with drain openings.

8. A back member for use in ventilating sashes for store fronts comprising a unitary element formed of a vertically disposed body portion, a cushioning portion extending forwardly from and positioned above the bottom of said body portion, means between the rear of said cushioning portion and the bottom of the body portion and means depending from the forward part of the cushioning portion for respectively supporting the latter at its rear and front and for maintaining it in spaced relation with respect to a sill, the means depending from the forward part of said cushioning portion being spaced rearwardly from the forward edge thereof, and a combined clamping member and gutter projecting forwardly at a downward inclination from the upper end of said body portion and provided with drain openings.

9. A back member for use in ventilating sashes for store fronts comprising a unitary element formed of a vertically disposed body portion, a cushioning portion extending forwardly from and positioned above the bottom of said body portion, supporting means for and depending from the rear of the cushioning portion and terminating in the bottom of said body portion, and a rearwardly directed angle shaped flange integral with the forward edge of the cushioning portion and including at its rear a vertical part opposing said means and providing a support for the front of the cushioning portion, and a combined clamping member and gutter projecting forwardly at a downward inclination from the upper end of said body portion and provided with drain openings.

10. A back member for use in ventilating sashes for store fronts comprising a unitary element formed of a vertically disposed body portion, a cushioning portion extending forwardly from and positioned above the bottom of said body portion, means between the rear of said cushioning portion and the bottom of the body portion and means depending from the forward part of the cushioning portion for respectively supporting the latter at its rear and front and for maintaining it in spaced relation with respect to a sill, and said body portion having lengthwise disposed slots and openings between the slots.

11. A back member for use in ventilating sashes for store fronts comprising a unitary element formed of a vertically disposed body portion, a cushioning portion extending forwardly from and positioned above the bottom of said body portion, means between the rear of said cushioning portion and the bottom of the body portion and means depending from the forward part of the cushioning portion for respectively supporting the latter at its rear and front and for maintaining it in spaced relation with respect to a sill, the means depending from the forward part of said cushioning portion being spaced rearwardly from the forward edge thereof, and said body portion having lengthwise disposed slots and openings between the slots.

12. A back member for use in ventilating sashes for store fronts comprising a unitary element formed of a vertically disposed body portion, a cushioning portion extending forwardly from and positioned above the bottom of said body portion, supporting means depending from the rear of the cushioning portion and terminating in the bottom of said body portion, and a rearwardly directed angle shaped flange integral with the forward edge of the cushioning portion and including at its rear a vertical part opposing said means and providing a support, and said body portion having lengthwise disposed slots and openings between the slots.

13. A back member for use in ventilating sashes for store fronts comprising a unitary body shaped to provide a vertically disposed body portion terminating at its top in a forwardly directed downwardly inclined part merging into a vertically disposed flange to provide in connection with said part a combined clamping member and gutter, said body portion at its bottom merging into an upwardly extending portion opposing the front of the body portion and terminating at its top in a horizontally disposed right angularly extending part providing a cushion terminating at its forward extremity into a rearwardly directed portion positioned against the lower face of the cushion and merging at its rear into a depending vertically disposed portion opposing the upwardly extending portion, said depending and upwardly extending portions providing supports for said cushion and for spacing it throughout above the bottom of the body portion.

14. A back member for use in ventilating sashes for store fronts comprising a unitary body shaped to provide a vertically disposed body portion terminating at its top in a forwardly directed downwardly inclined part merging into a vertically disposed flange to provide in connection with said part a combined clamping member and gutter, said body portion at its bottom merging into an upwardly extending portion opposing the front of the body portion and terminating at its top in a horizontally disposed right angularly extending part providing a cushion terminating at its forward extremity into a rearwardly directed portion positioned against the lower face of the cushion and merging at its rear into a depending vertically disposed portion opposing the upwardly extending portion, said depending and upwardly extending portions providing supports for said cushion and for spacing it throughout above the bottom of the body portion, said body portion formed with longitudinal slots and openings between the slots, and said inclined part formed with drain openings.

In testimony whereof, I affix my signature hereto.

EDWARD FRANCIS McHUGH.